Patented Nov. 22, 1932

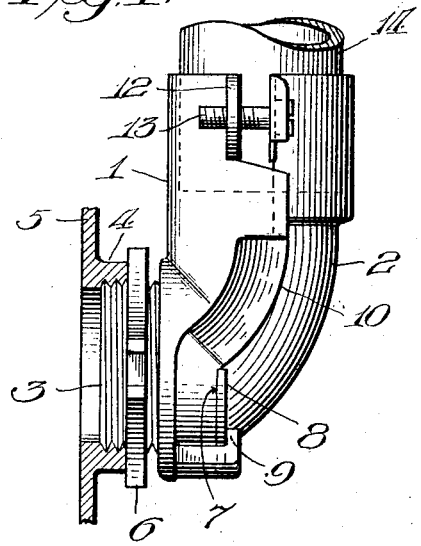
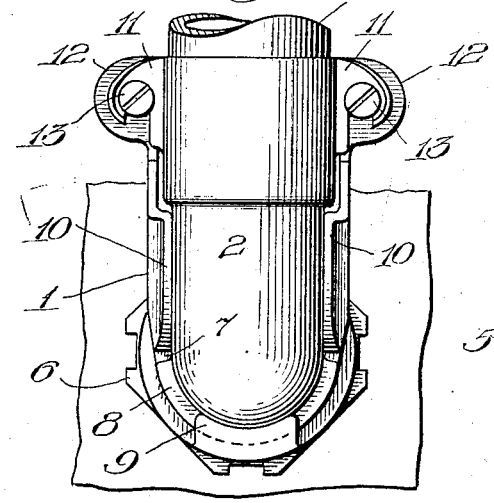
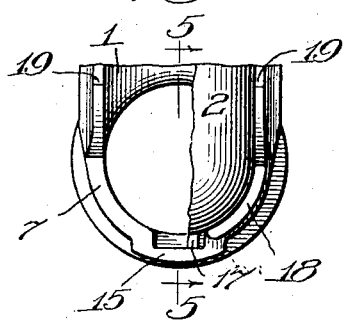
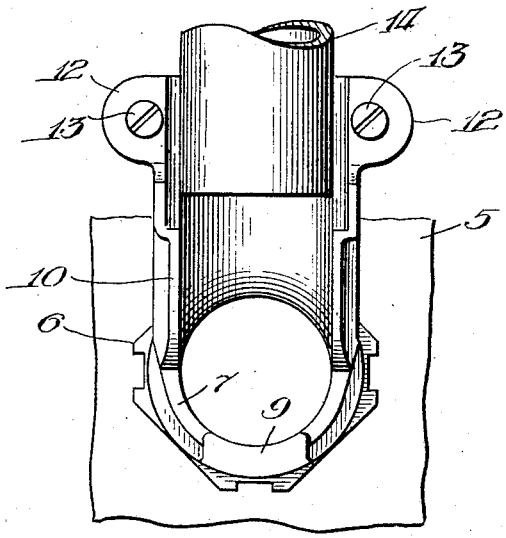
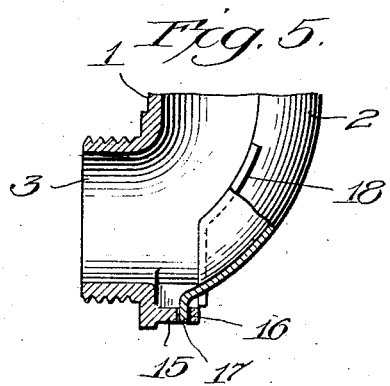

1,888,546

UNITED STATES PATENT OFFICE

ERNST G. K. ANDERSON, OF CHICAGO, ILLINOIS, ASSIGNOR TO APPLETON ELECTRIC COMPANY, A CORPORATION OF ILLINOIS

BOX CONNECTION OR ELBOW

Application filed April 5, 1930. Serial No. 441,736.

The present invention relates to protective conduit systems for electric wiring or cables and particularly to a box connection through which the cables or wires pass; and it has for its object to produce a simple and novel device of this kind that will give ready access to the wires or cables at the point where they enter the box, without disturbing the box or the conduit system.

In carrying out my invention, I employ a conduit section in the form of an elbow adapted to be screwed or otherwise fastened at one end to the box, a large section on the convex side of the elbow, extending inwardly from the other end, being cut away and there being a complementary elbow section fastened in place in such a manner as not only to complete the contour of the elbow but also to serve as one member of a two part clamp to connect the other end of the elbow to a conduit; this complementary section being easily removable, preferably without completely detaching any screws or other fastening means.

Therefore, viewed in one of its aspects, the present invention may be said to have for its object to produce a simple and novel two-part elbow device that will give easy access to wires or cables passing through the same from one to the other of two members connected together by the elbow.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of a device embodying my invention connected to a conduit and to a wall of a box or the like; Fig. 2 is an elevation, looking at the side which is toward the right in Fig. 1; Fig. 3 is a view similar to Fig. 2, the detachable elbow section being omitted; Fig. 4 is a view similar to Fig. 3, illustrating a slight modification, only a fragment of the elbow being shown, and a portion of the detachable elbow section being broken away; and Fig. 5 is a section on line 5—5 of Fig. 4, a part of the detachable section being in elevation.

Referring to Figs. 1 to 3 of the drawing, 1 and 2 are two members which, when placed together, form a conduit in the shape of an elbow. The member 1, which may be called the body member, has a continuous tubular part 3 at one end. The part 3 may be screw-threaded or otherwise fashioned to permit its attachment to a conduit or to a tubular boss 4 on a wall 5 of a box or the like. When the construction is such that the end 3 of the elbow is screwed into the boss 4, a lock nut 6 may be employed to make the connection secure. The line of division between the two members of the elbow is approximately along the longitudinal center line along the sides of the elbow to the part 3 and then outwardly to the periphery of the elbow in a plane parallel with the long axis of the divided end of the elbow to form a plane bearing face 7 on the inner end of the part 3. The member 2, which may be of sheet metal as it need not be as heavy as the body member, has at its inner end a flange 8 that rests on the seat 7. The member 2 lies between and slightly overlaps the sides of the trough in the body member. On the inner end of the part 3 is a lug having a lip 9 overlying the flange 8. It will be seen that when the two members of the elbow are laid upon each other with the flange 8 resting on the seat 7 and underlying the lip 9, they are interlocked against relative endwise or sidewise sliding movements; but they may be separated by swinging the free or outer end of the member 2 toward the right, as viewed in Fig. 1, until the flange 8 is lifted out of the corner between the plane surface 7 and the curved edges 10 of the trough in the body member. After the member 2 has been swung into the position just described, it may be withdrawn in the lengthwise direction from engagement with the lip 9. It will be seen that the lip and the flange form a separable hinge between the two members.

The outer or free end of the member 2 does not rest upon the body member but is spaced apart therefrom and has on opposite sides ears in the form of hooks 11 whose open sides are directed inwardly or toward the opposite end of the elbow. On the sides of the trough of the body member, opposite the hooks 11, are ears 12. Associated with the ears 12 are long headed screws 13 which, in turn, engage the hooks and serve to draw the adjacent ends of the elbow members together. These screws are preferably made long enough to permit the member 2 to be swung out far enough to make its complete withdrawal possible, without detaching the screws from the ears 12. Therefore, when it is desired to gain access to the wires or cables, the lid of the elbow, as it were, may quickly be detached without separating any other element from the elbow; the entire inner end of the section 1 of the elbow being uncovered and providing the box with a window of the full area of the bore in the elbow.

Since the greater part of the member 2 simply extends into the trough of the body member, the free or outer end may be drawn tightly against a pipe or conduit 14 entered in the elbow at that end. In other words, one end of the elbow constitutes a clamp to secure the elbow to a pipe or conduit.

In Figs. 4 and 5, I have shown a slight modification. The lug 15 on the part 1 has an eye 16 through which extends a lip 17 on the inner end of the member 2 to produce the separable hinge. Also the flange 18 abuts against an abrupt shoulder 19 on each of the sides of the trough in the body member 1.

While I have illustrated and described with particularity only a single form of my invention, with a slight modification, I do not desire to be limited to the exact structural details thus illustrated and described; but intend to cover all forms and arrangements which come within the definitions of my invention constituting the appended claims.

I claim:

1. A tubular elbow divided into two separate members through one end to a point past the turn, interlocking shoulders between said members at said point to form a separable hinge connection, and screws connecting said members at the aforesaid end of the elbow.

2. A tubular elbow comprising a body member having the convex side cut away through one end around the turn in the elbow and an unmutilated part beyond the turn, a complementary member co-operating with the body member to complete the elbow, interlocking shoulders between the body member and the adjacent end of said complementary member adapted to be interengaged by an endwise and swinging movement of the latter member to form a separable hinge connection at the inner end of the complementary member and an interlock between said members, and screws connecting said members at the outer end of said complementary member.

3. A tubular elbow comprising a body member having the convex side cut away from one end around the turn and unmutilated at the other end, and a separate complementary member co-operating with the body member to complete the elbow, said members having interengaging shoulders to hold said auxiliary member against lengthwise or sidewise movements when said members are assembled together and also interlocking shoulders to constitute a separable hinge between the inner end of the auxiliary member and the unmutilated portion of the body member, and screws holding the outer end of the auxiliary member to the body member.

4. A tubular elbow comprising a body member having the convex side cut away from one end around the turn and unmutilated at the other end, and a separate complementary member co-operating with the body member to complete the elbow, said members having interengaging shoulders to hold said auxiliary member against lengthwise or sidewise movements when said members are assembled together and also interlocking shoulders to constitute a separable hinge between the inner end of the auxiliary member and the unmutilated portion of the body member, hooks at the sides of the outer end of the auxiliary member overlying the body member and having their open sides facing the opposite end, and headed screws screwed into the body member in position to be engaged in said hooks and lock the two members together, said screws being long enough to permit the outer end of the auxiliary member to be lifted high enough, without detaching the screws, to remove it from the body member.

5. A tubular elbow comprising a body member having the inner end shaped to be screwed into an opening in a wall or socket, the convex side of the elbow being cut away around the bend and out through the outer end, a separate complementary member for closing the open side of the body member, said members having engaging and overlapping parts to hold said members in elbow shape while permitting the complementary member to be disengaged by lifting its outer end and withdrawing it lengthwise, and screw means for drawing the outer end toward the body member and securing it thereto.

6. A tubular elbow comprising a body member having the inner end shaped to be screwed into an opening in a wall or socket, the convex side of the elbow being cut away around the bend and out through the outer end, a separate complementary member for closing the open side of the body member, said members having engaging and overlapping parts to hold said members in elbow shape and leave the outer end of the complementary member spaced apart from the corresponding portion of the body member while permitting the complementary member to be disengaged by lifting its outer end and withdrawing it lengthwise, and screw means for drawing the outer end toward the body member and securing it thereto.

7. A tubular elbow comprising a body member having the inner end shaped to be screwed into an opening in a wall or socket, the convex side of the elbow being cut away around the bend and out through the outer end, a separate complementary member for closing the open side of the body member, said members having engaging and overlapping parts to hold said members in elbow shape and leave the outer end of the complementary member spaced apart from the corresponding portion of the body member while permitting the complementary member to be disengaged by lifting its outer end and withdrawing it lengthwise, the outer end of the complementary member having at the sides of the outer end hooks open toward the inner end, and headed screws screwed into the body member and engaged with said hooks, said screws being long enough to permit the outer end of the complementary member to be lifted far enough, without completely unscrewing the screws, to make it possible to lift the outer end of the complementary member high enough to withdraw the complementary member.

In testimony whereof, I sign this specification.

ERNST G. K. ANDERSON.